(12) United States Patent
Kim et al.

(10) Patent No.: US 9,104,188 B2
(45) Date of Patent: Aug. 11, 2015

(54) EQUIPMENT CONTROLLING SYSTEM AND CONTROLLING METHOD THEREOF

(75) Inventors: Bub Lae Kim, Changwon-si (KR); Jong Wook Kim, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 1503 days.

(21) Appl. No.: 12/213,866

(22) Filed: Jun. 25, 2008

(65) Prior Publication Data

US 2009/0193291 A1 Jul. 30, 2009

(30) Foreign Application Priority Data

Jan. 28, 2008 (KR) .................. 10-2008-0008653
Feb. 5, 2008 (KR) .................. 10-2008-0011802

(51) Int. Cl.
*G06F 11/20* (2006.01)
*G05B 19/042* (2006.01)

(52) U.S. Cl.
CPC .................. *G05B 19/0428* (2013.01)

(58) Field of Classification Search
CPC ...................................... G06F 11/20
USPC ............ 714/10; 700/3, 7, 81, 82, 276; 236/51
See application file for complete search history.

(56) References Cited

U.S. PATENT DOCUMENTS

| 4,141,066 A | 2/1979 | Keiles |
| 5,796,936 A | 8/1998 | Watabe et al. |
| 2008/0185448 A1* | 8/2008 | Kim et al. ............... 236/51 |

FOREIGN PATENT DOCUMENTS

| JP | 2003329291 A | * 11/2003 |
| WO | WO 00/23857 | 4/2000 |

* cited by examiner

*Primary Examiner* — Tejal Gami
(74) *Attorney, Agent, or Firm* — McKenna Long & Aldridge LLP

(57) ABSTRACT

An equipment controlling system and a controlling method thereof are disclosed. The system includes a first controller connected to equipments of a first group to monitor and control operations of the equipments; and a second controller connected to equipments of a second group to monitor and control operations of the equipments; the first controller emergently controlling the equipments of the second group when the second controller malfunctions, and the second controller emergently controlling the equipments of the second group when the first controller malfunctions. When control problem of equipments such as indoor and outdoor unit due to malfunction of a controller is solved, a systemic and consistent control are enabled by consistently controlling the equipments so that control efficiency is enhanced and the equipments are kept in operating to provide a comfortable condition and an improved convenience to a user.

12 Claims, 14 Drawing Sheets

Fig.7
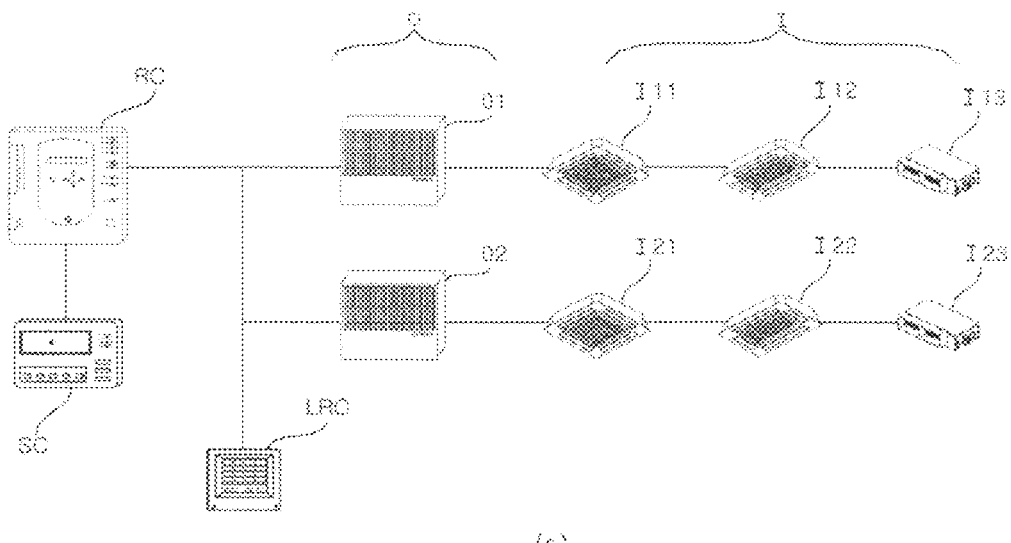
(a)
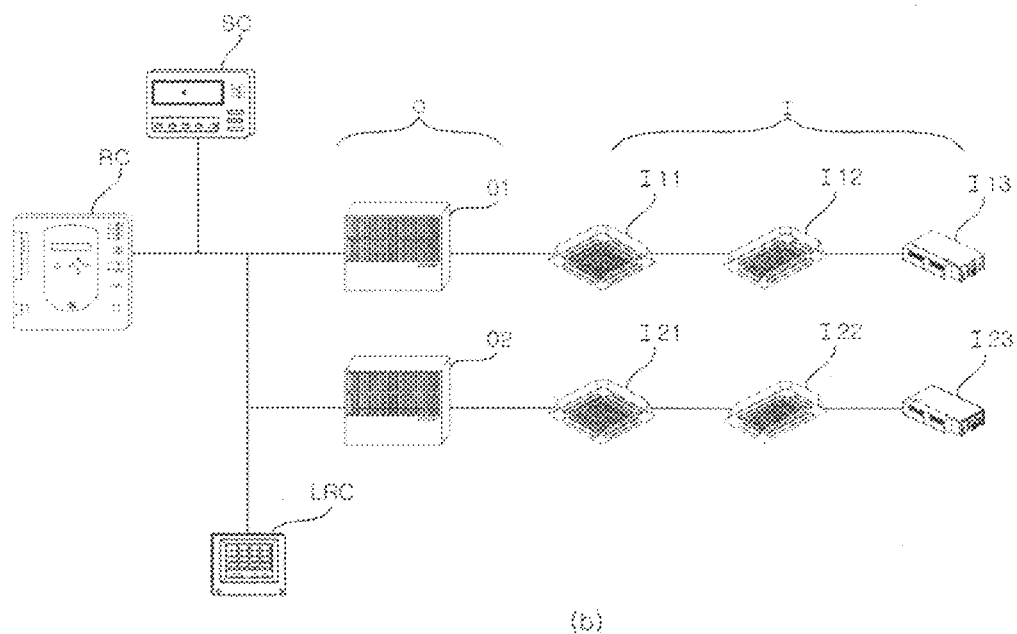
(b)

EQUIPMENT CONTROLLING SYSTEM AND CONTROLLING METHOD THEREOF

This nonprovisional application claims priority under 35 U.S.C. §119(a) on Patent Application Nos. 10-2008-0008653 and 10-2008-0011802 filed in Republic of Korea on Jan. 28, 2008 and Feb. 5, 2008, the entire contents of which are hereby incorporated by reference.

BACKGROUND OF THE INVENTION

1. Field of the Invention

The present invention relates to an equipment controlling system and a controlling method thereof, and more particularly, to an equipment controlling system for controlling equipments through other controller or a separated emergency controller when a controller for controlling a plurality of equipments malfunctions, and a controlling method thereof.

2. Discussion of the Related Art

Generally, an air conditioner among equipments which are installed in a desired area or a building is provided to perform cooling, heating, and air purification and is installed to discharge chilled or hot air into indoor and to purify indoor air for the purpose of making more comfortable indoor environment to human beings. The air conditioner is operated by which an indoor unit having a heat exchanger and an outdoor unit having a compressor and a heat exchanger are separately controlled and an electric power to be supplied to the compressor and the heat exchanger is controlled.

In the air conditioner, a plurality of outdoor units can be connected to a plurality of indoor units. At least one of the outdoor units is driven corresponding to the number of driven indoor units to supply refrigerant to the indoor units based on required operating mode so that the air conditioner is operated in a cooling mode or a heating mode.

In the air conditioner, when a remote controller malfunctions, equipments which are connected to the remote controller are not operated according to a target schedule and further the equipments are not operated so that a user may meet inconvenience.

Particularly, in a case of the remote controller's performing power consumption of the equipments through the remote controller, when the remote controller is unable to control the equipments due to the malfunction, the power consumption would exceed target power consumption.

In the equipment controlling system, the air conditioner includes a controller for controlling the plurality of indoor unit and outdoor units from a center and the equipments are integrally controlled by the controller. When the controller malfunctions in this system, the equipments are not operated normally or according to target schedule so that the user may meet inconvenience.

SUMMARY OF THE INVENTION

It is an object of the present invention to provide an air condition for controlling a plurality of equipments, respectively including indoor units and outdoor units, using a plurality of controllers group by group, for emergently controlling the equipments using another controller when there is a malfunctioning controller, and further including an emergency controller for emergently controlling the equipments to enable smooth and consistent control of the equipments without stopping the equipments, and a controlling method thereof.

The present invention provides an equipment controlling system comprising: a first controller connected to equipments of a first group to monitor and control operations of the equipments; and a second controller connected to equipments of a second group to monitor and control operations of the equipments; the first controller emergently controlling the equipments of the second group when the second controller malfunctions, and the second controller emergently controlling the equipments of the second group when the first controller malfunctions.

The present invention provides an emergency controlling method of an equipment controlling system, comprising: determining a malfunction of a second controller for controlling equipments of a second group by a first controller for controlling equipments of a first group; emergently controlling the equipments of the second group based on stored emergency control data; and storing a controlled record on the equipments of the second group.

According to the equipment controlling system and the controlling method thereof according to the present invention, when any one of a plurality of controllers malfunctions, other controller or an emergency controller emergently controls the equipment of the malfunctioned controller to prevent damage caused by the malfunction, to enable a systemic and consistent control by consistently controlling the equipments so that control efficiency is enhanced and the equipments are kept in operating to provide a comfortable condition and an improved convenience to a user.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a system diagram illustrating an equipment controlling system according to a fourth embodiment of the present invention;

DETAILED DESCRIPTION OF THE PREFERRED EMBODIMENTS

Hereinafter, embodiment of the present invention will be described with reference to the accompanying drawing in detail.

Figure 1:
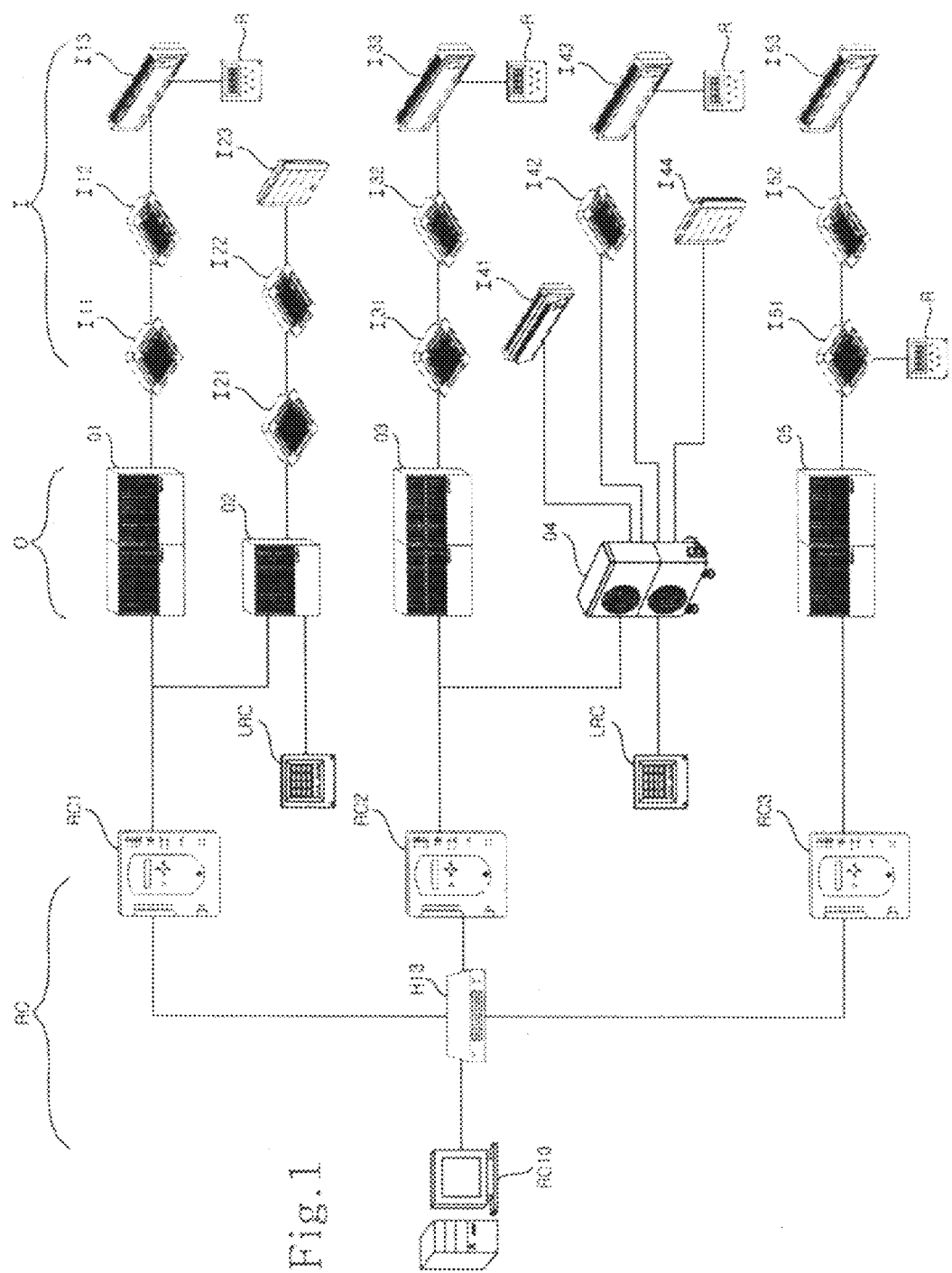
FIG. 1 is a system diagram illustrating an equipment controlling system according to an embodiment of the present invention.

FIG. 1 is a system diagram illustrating an equipment controlling system according to an embodiment of the present invention.

The equipment controlling system according to an embodiment of the present invention, as illustrated in FIG. 1, includes at least one indoor unit I installed indoor and at least one outdoor unit O connected to the indoor unit I and including a compressor and a heat-exchanger. Moreover, the equipment controlling system further includes a controller connected to the outdoor unit O or the indoor unit I to monitor an operating status thereof. Here, the controller includes a local controller LRC, a remote controller RC, and a remote control R. As occasion demands, the controller may include a distributor installed between the outdoor unit O and the indoor unit I.

Moreover, the equipment controlling system may further include other equipments such as a ventilation system, a humidifier, an air purifier, a heater, and the like, which are integrally controlled by the controller. However, the present invention will be described by taking the indoor unit I and the outdoor unit O into an example of the equipments by considering a case of connecting the indoor unit and the outdoor unit to the controller, but the present invention may be applied to a case when such equipments are additionally connected.

The outdoor unit O includes a compressor to receive and compress a refrigerant, an outdoor heat-exchanger to perform heat-exchange between the refrigerant and ambient air, an accumulator to extract a gas refrigerant from the feed refrigerant and to feed the gas refrigerant to the compressor, and a four-way valve to select a passage of the refrigerant according to a heating mode. The outdoor unit O includes a high pressure sensor to measure a pressure of the refrigerant discharged from the compressor and a low pressure sensor to measure a pressure of the refrigerant to be fed to the compressor. In addition, the outdoor unit O further includes a plurality of sensors, valves, and an oil skimmer but their descriptions will be omitted.

The indoor unit I includes an indoor heat-exchanger, an indoor fan, an expansion valve in which the refrigerant fed from the outdoor unit O is expanded, and a plurality of sensors.

At least one indoor unit I may be installed indoor and one or more outdoor units O are driven by a demand of at least one indoor unit I, and the number of the outdoor units O and the number of the compressors installed in the outdoor units O are changed as cooling/heating capacity is varies in response to the driven indoor unit I. Here, the number of the outdoor units may be varied according to the capacity of cooling and/or heating corresponding to the number of stopped indoor units and the capacity of the installed compressors.

The outdoor unit O and the indoor unit I are connected to each other via a refrigerant tube to perform the cooling or heating operation as the refrigerant flows between the outdoor unit O and the indoor unit I and to transmit and receive data to and from in a desired communication manner.

The remote controller RC is connected to the indoor unit I and the outdoor unit O. The remote controller RC transmits and receives data in the desired communication manner to monitor operations of the indoor unit I and the outdoor unit O and to create a control command in response to a user's command so as to transmit the control command to the indoor unit and the outdoor unit such that the indoor unit and the outdoor unit perform a desired operation. Here, the remote controller RC includes a converter to convert data with different protocol or a gateway.

In this case, a plurality of remote controllers RC may be connected to the indoor unit I and the outdoor unit O, such that the remote controllers RC are connected to each other to transmit and receive data and to share data for controlling the indoor unit and the outdoor unit.

Here, first to third remote controller RC1 to RC3 are respectively connected to groups of the indoor units and the outdoor units, are connected to each other through a certain sharing device H13, and are connected to a fourth remote controller RC 10 through the sharing device H13.

The first remote controller RC1 is connected to first to sixth indoor units I11 to I13 and I21 to I23 and first and second outdoor units O1 and O2, and a second remote controller RC2 is connected to seventh to thirteenth indoor units I31 to I33 and I41 to I44 and third and fourth outdoor units O3 and O4. A third remote controller RC3 is connected to fifteenth to seventeenth indoor units I51 to I53 and a fifth outdoor unit O5.

The first to third remote controllers RC1 to RC3, as described above, are connected to the indoor units and the outdoor units to monitor the operation status of the respective equipments and to control the respective equipments.

In this case, the fourth remote controller RC10 monitors information of the equipments, connected to the respective remote controllers, received from the first to third remote controllers RC1 to RC3, and controls the equipments through the first to third remote controllers RC1 to RC3. Here, the fourth remote controller RC10 integrally controls all the equipments. The fourth remote controller RC10 integrally controls all the equipments connected to the first to third remote controllers RC1 to RC3.

The remote control R is connected to the indoor unit to display the operation status of the connected indoor unit and controls the indoor unit according to the user's command. The remote control R may be a wire remote control connected to the indoor unit in a wire line to perform a bidirectional communication, or a wireless remote control to input a control command to the indoor unit in a desired wireless line.

The remote control R is connected to a single indoor unit or a plurality of indoor units. In a case of being connected to a plurality of indoor units, the remote control displays the operation status of any one of the plural indoor units and transmits the same control command to the connected plural indoor units.

The local controller LRC and the remote control are connected to a plurality of indoor units and outdoor units to control the plurality of indoor units and outdoor units and to monitor the operation statuses thereof. In this case, the number of the local controller LRC is equal to or less than the number of indoor units capable of being controlled by the remote controller. As occasion demands, the local controller may control only the connected indoor unit.

Hereinafter, similar or identical reference numeral and terms are assigned to similar or identical components and their description will be omitted.

Figure 2:
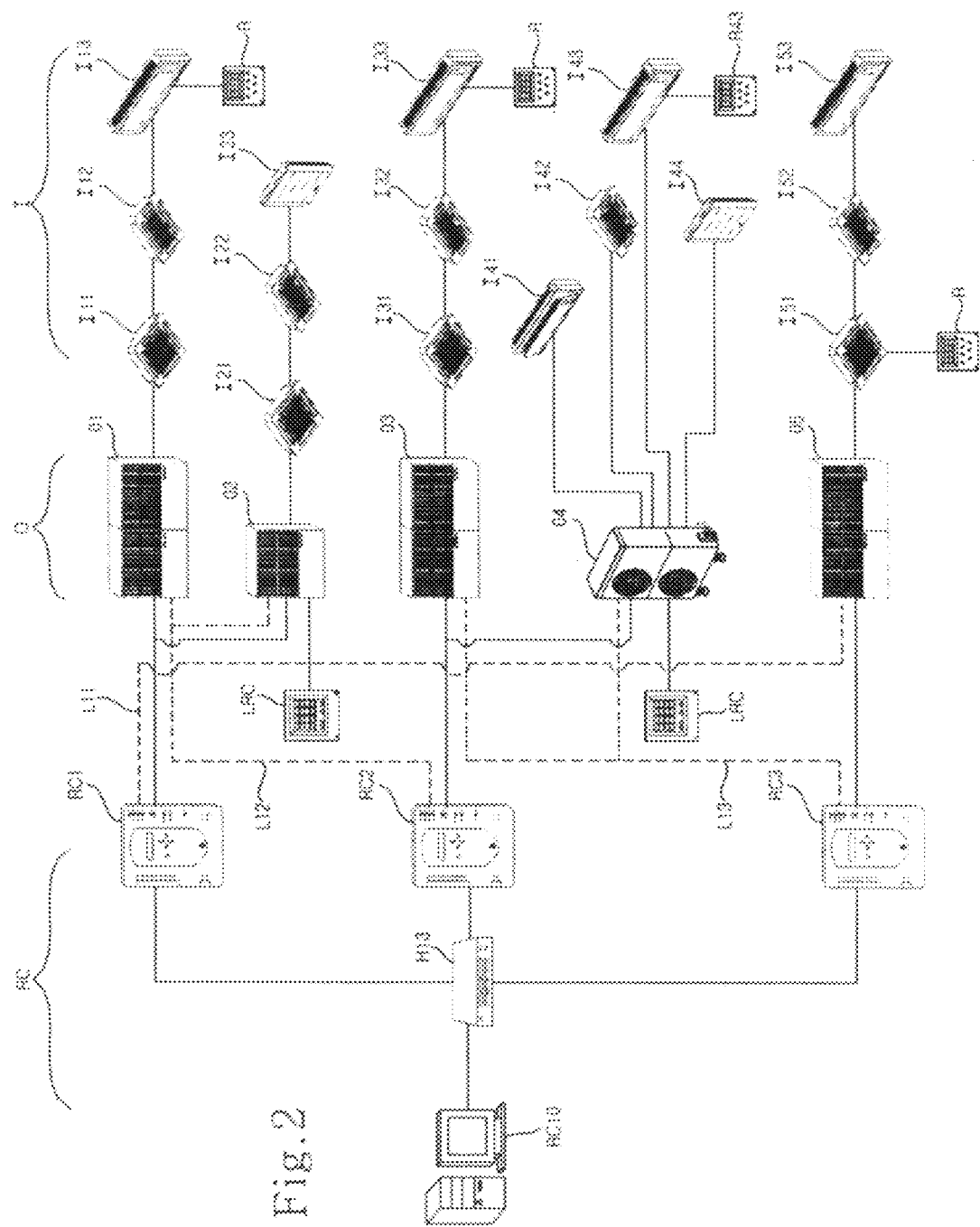
FIG. 2 is a system diagram illustrating an emergency control line of the equipment controlling system according to a first embodiment of the present invention.

FIG. 2 is a system diagram illustrating an emergency control line of the equipment controlling system according to a first embodiment of the present invention.

Referring to FIG. 2, the equipment controlling system configured as illustrated in FIG. 1 is connected to other remote controller different from the remote controller that is connected to the respective indoor units and the respective outdoor units through emergency control lines L11 to L13.

The first to sixth indoor units I11 to I13 and I21 to I23 connected to the first remote controller RC1 and the first and second outdoor units O1 and O2 are connected to the second remote controller RC2 through a second emergency control line L12. Moreover, the third remote controller RC3 is connected to the seventh to thirteenth indoor units I31 to I33 and I41 to I44 of the second remote controller and the third and fourth outdoor units O3 and O4 through a third emergency control line L13. The first remote controller RC1 is connected to the equipments connected to the third remote controller RC3, that is, the fourteenth to sixteenth indoor units I51 to I53 and the fifth outdoor unit O5 through the first emergency control line L11. Here, the order of the connection between the respective remote controllers and the indoor units and the outdoor units through the emergency control lines as illustrated in the drawing is an illustrative example and may be modified as occasion demands, and the first remote controller RC1 may be connected the equipments of the second remote controller.

In this case, the first to third emergency control lines L11 to L13 may be the same communication cable as that through which the outdoor units are connected to the remote controller.

Here, other remote controller is designated to every remote controller connected to the equipment controlling system, except for a specific remote controller, and for example, when the first remote controller malfunctions, one of the second remote controller and the third remote controller performs the emergency control or the fourth remote controller may perform the emergency control as occasion demands.

The first to third remote controllers RC1 to RC3 communicate with the basically connected indoor units and outdoor units to monitor and control the operations of the indoor units and the outdoor units, and to emergently control the indoor units and the outdoor units connected thereto through the emergency control line when the emergency control is required.

In other words, the first remote controller RC1 controls the first to sixth indoor units I11 to I13 and I21 to I23 and the first and second outdoor units O1 and O2, and at the same time, emergently controls the fourteenth to sixteenth indoor units I51 to I53 and the fifth outdoor unit O5 through the first emergency control line L11 when the third remote controller RC3 malfunctions and the equipments cannot be controlled. Moreover, the second remote controller RC2 emergently controls the equipments connected to the first remote controller RC1 through the second emergency control line L12 when the first remote controller RC1 malfunctions.

Here, the first to third remote controllers RC1 to RC3 are connected to each other to perform mutual communication periodically, and to emergently control the equipments by determining the malfunctioning of a corresponding remote controller when the communication is disconnected for a preset time.

Moreover, the first to third remote controllers RC1 to RC3 determines the malfunctioning of a corresponding remote controller to perform the emergency control when a request for the emergency control is received from the outdoor unit or the indoor unit through the emergency control line.

When there is the fourth remote controller RC10 connected to an upper level, the first to third remote controllers RC1 to RC3 control the equipments of a corresponding remote controller when information of a malfunctioned remote controller is received from the fourth remote controller RC10.

In this case, when the emergency control is performed, the first to third remote controllers RC1 to RC3 store control records on the corresponding equipments, and transmit the control record when the malfunctioned remote controller normally works. Here, the control records of the emergency control may be transmitted to the fourth remote controller RC10.

Figure 3:
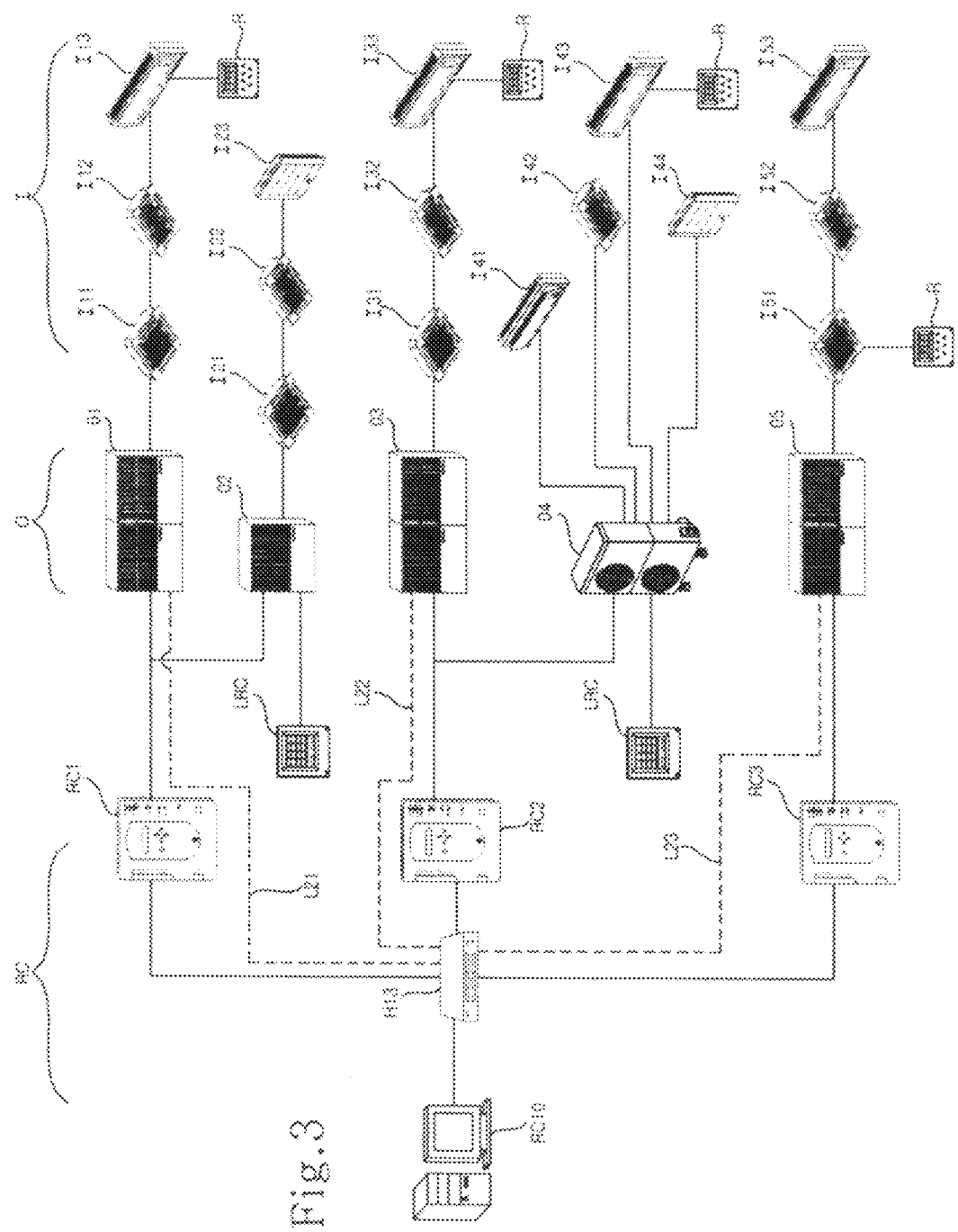
FIG. 3 is a system diagram illustrating an emergency control line of the equipment controlling system according to a second embodiment of the present invention.

FIG. 3 is a system diagram illustrating an emergency control line of the equipment controlling system according to a second embodiment of the present invention.

As illustrated in FIG. 3, in the equipment controlling system, since a plurality of outdoor units, indoor units, and remote controllers are connected to each other through emergency control lines L21 to L23, the equipments of a corresponding remote controller are emergently controlled by other remote controller when any one of the remote controllers malfunctions. The first to third remote controllers RC1 to RC3 are connected to each other by a certain sharing device H13.

The first to sixth indoor units I11 to I13 and I21 to I23 and the first and second outdoor units O1 and O2, connected to the first remote controller RC1, are connected to the sharing device H13 through the fourth emergency control line L21. Moreover, the seventh to thirteenth indoor units I31 to I33 and I41 to I44 and the third and fourth outdoor units O3 and O4 of the second remote controller are connected to the sharing device through the fifth emergency control line L22, and the fourteenth to sixteenth indoor units I51 to I53 and the fifth outdoor unit O5, connected to the third remote controller RC3, are connected to the sharing device H13 through the sixth emergency control line L23.

In this case, when the respective outdoor units are connected to the sharing device, a desired gateway may be further connected to the respective emergency control lines. Moreover, the gateway may be built in the sharing device.

Here, the first to third remote controllers RC1 to RC3, as described above with reference to FIG. 2, perform the data communication with the remote controllers, request the emergency control of the outdoor units or the indoor units, determine a malfunctioning remote controller from information of the fourth remote controller RC10, and perform the emergency control the equipments of the malfunctioning remote controller. Moreover, the fourth remote controller RC10 may receive the request from the outdoor units or the indoor units and may transmit the information of the malfunctioning remote controller to a normal remote controller.

In this case, the first to third remote controllers RC1 to RC3 emergently control the indoor units and the outdoor units using the respective emergency control lines through the sharing device H13. As occasion demands, the fourth remote controller RC10 may emergently control the equipments of the malfunctioning remote controller.

Here, when any one of the first to third remote controllers RC1 to RC3 malfunctions and is unable to be controlled, any one of normally working remote controllers emergently controls the equipments of the malfunctioning remote controller.

In this case, a normal remote controller with a lower controlled load of the first to third remote controllers RC1 to RC3 performs the emergency control according to the quantity of controlled load. Moreover, any one remote controller may perform the emergency control in a certain order or a remote controller assigned by the fourth remote controller RC10 may perform the emergency control. The basis of selecting a remote controller for the emergency control may be changed according to a preset rule.

Figure 4:
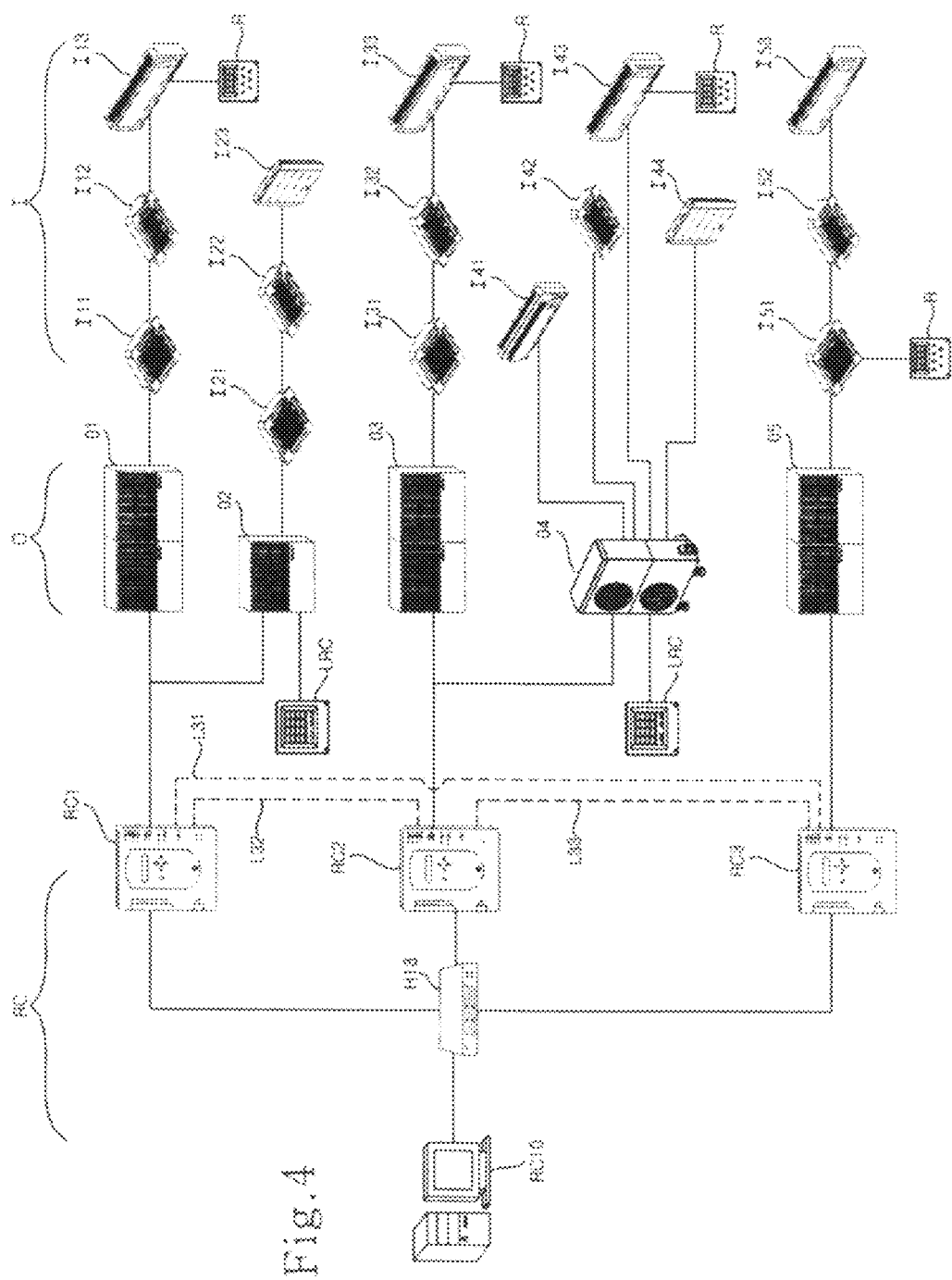
FIG. 4 is a system diagram illustrating an emergency control line of the equipment controlling system according to a third embodiment of the present invention.

FIG. 4 is a system diagram illustrating an emergency control line of the equipment controlling system according to a third embodiment of the present invention.

Referring to FIG. 4, the first to third remote controllers RC1 to RC3 are connected to each other through emergency control lines and control the equipments such as indoor units and outdoor units through the respective emergency control lines.

The first remote controller RC1 is connected to the third remote controller RC3 through a seventh emergency control line L31, and is connected to the second remote controller RC2 through an eighth emergency control line L32. The second remote controller RC2 is connected to the third remote controller RC3 through a third emergency control line L33.

By doing so, when the first remote controller RC1 malfunctions, the second remote controller RC2 or the third remote controller RC3 emergently controls the first to sixth indoor units I11 to I13 and I21 to I23 and the first and second outdoor units O1 and O2 which are connected to the first remote controller RC1. In this case, the remote controller performing the emergency control, as described above with reference to FIG. 3, is selected by a preset rule. Meanwhile, the first emergency control line L31 may not be connected, and in this case, the emergency control under the malfunction of the first remote controller RC1 is performed by the second remote controller RC2.

Here, the first to third remote controllers RC1 to RC3 include desired connection device for connecting the emergency control lines to the communication lines of the indoor units and the outdoor units. Since the communication lines of the indoor units and the outdoor units are electrically connected to the emergency control lines, the communication is enabled when the emergency control is required. In this case, if there is a difference between protocols of the communication lines for the indoor units and the outdoor units and the emergency control lines, the communication lines are connected to the emergency control lines by a converter or a gateway which is provided in the remote controller and data are converted into suitable to be suited to the protocols for the transmission.

Figure 5:
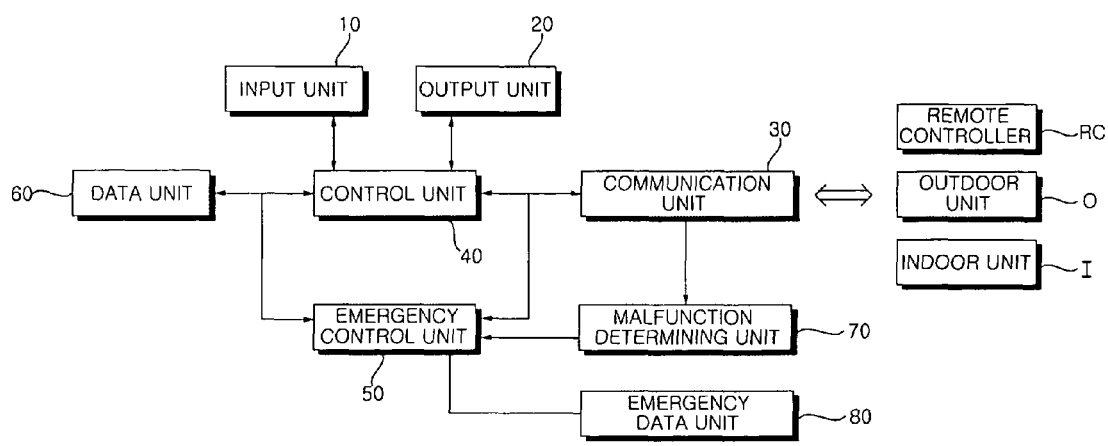
FIG. 5 is a block diagram illustrating a configuration of a remote controller according to the first to third embodiments of the present invention.

FIG. 5 is a block diagram illustrating a configuration of a remote controller according to the first to third embodiments of the present invention.

As illustrated in FIG. 5, the remote controller RC according to the first to third embodiments of the present invention includes a data unit 60, an input unit 10, an output unit 20, a control unit 40, a communication unit 30, an emergency control unit 50, a malfunction determining unit 70, an emergency data unit 60, and an interface 90.

The configuration of the remote controller can be applied to the first to third remote controllers RC1 to RC3 even to the fourth remote controller RC10 if necessary.

The data unit 60 stores controlled data, schedule data, and power controlled data with respect to connected indoor unit and outdoor unit and other equipments, preset data of driving the remote controller RC, controlled data of the remote controller RC, and address data for transmitting and receiving data to and from the indoor units and the outdoor units and data to be transmitted to and received from the indoor units and the outdoor units. In addition, the data unit 60 stores screen formation data and sound effect data which are outputted from the output unit 20.

On the other hand, the emergency data unit 80 stores emergency data received from another remote controller, that is, data for controlling the equipments of another remote controller. The emergency data unit 80 stores priority data of control operations firstly carried out when the emergency control is performed, together. In this case, the emergency data unit 80 is periodically updated by the communication with other remote controllers. The emergency data unit 80 distinguishes and stores the emergency control data by the respective remote controllers together with address information for the communication with the indoor units and the outdoor units through the emergency control lines.

The input unit 10 includes at least one data input device for inputting data by pressing or touching and applies the input data to the control unit 40.

The output unit 20 includes a display device and displays operation statuses of the indoor units I or the outdoor units O on a screen. In this case, the output unit 20 may further a speaker or a lamp in order to output an alarm sound or sound effect during the operation or in order for the lamp to be turned on or off to display the statuses.

The communication unit 30 includes a communication module for at least one protocol to transmit and receive data to and from the indoor units and the outdoor units, and handles an external access through Internet. The communication unit 30 transmits a control command of the control unit 10 to the equipments such as the indoor units and the outdoor units and other remote controllers by transmitting and receiving data to and from the same, and receives operation status data of the respective equipments.

In this case, the communication unit 30 may transmit and receive data in different protocols during the data communication with the indoor units or the outdoor units, a ventilation system or an air purifier, and the external access, and may further include a converter for converting data between different protocols or a gateway if necessary.

Moreover, the communication unit 30 further includes an interface having digital input and output terminals, communication line connecting terminals, and emergency control line connecting terminals. In this case, the communication unit 30 further includes a connecting device to switch an electrical connection between the communication line connecting terminals and the emergency control line connecting terminals. Communication lines are connected from the indoor units and the outdoor units to the communication line connecting terminals, and the emergency control lines are connected to the emergency control line connecting terminals. If the communication with the indoor units and the outdoor units is different from the communication through the emergency control lines, the connections may be achieved by the converter or the gateway. In this case, the communication line connecting terminals and the emergency control line connecting terminals are connected to each other by the switching of the connecting device.

The malfunction determining unit 70 determines the malfunction of other remote controllers in correspondence with data received from any one of the indoor units or the outdoor units, other remote controllers, and the fourth remote controller. In this case, the malfunction determining unit 70 determines that a corresponding remote controller malfunctions, emergency control request signals of which are received from the indoor units, the outdoor units, and other remote controllers through the emergency control lines connected as illustrated in FIGS. 2 to 4, and transmits the result to the control unit 40. Moreover, when information on malfunction or an emergency control command of other remote controller is received from the fourth remote controller RC10, the malfunction determining unit 70 determines that the corresponding remote controller malfunctions.

The malfunction determining unit 70 performs malfunction self-diagnosis of the remote controller according to data transmitted and received through the communication unit 30. In other words, the malfunction determining unit 70 may voluntarily determines that the remote controller malfunctions when data are neither transmitted nor received through a specific communication port provided in the communication unit 30 for a preset time. When the malfunction is determined as a result of the self-diagnosis, the malfunction determining unit 70 transmits a signal of indicating the malfunction to the emergency control unit 50.

Here, in a case where the malfunction is determined by the malfunction determining unit 70 itself or a signal of indicating the malfunctioning of other remote controller is received, the malfunction of the remote controller may be determined when the remote controller does not normally work due to defect or abnormality of the remote controller as well as when the communication is disconnected due to the trouble of the communication line to the indoor units or the outdoor units although the remote controller normally works. In other words, when there is a trouble on the communication line between the first remote controller RC1 and the first outdoor unit O1 so that mutual data transmission is unable, since the first remote controller RC1 cannot control the first outdoor unit O1, the emergency control is performed by other remote controller even this case.

The control unit 40 processes data transmitted and received through the communication unit 30, controls the input and output of the data through the input unit 10 and the output unit 20 to control the equipments such as the indoor units and the outdoor units, and displays the operation statuses of the respective equipments through the output unit 20. The control unit 40 creates a control command such that the respective equipments perform preset operations in response to a user's command inputted by the input unit 10, transmits the control command through the communication unit 30, and stores a record on the data to be transmitted and received in the data unit 60.

The control unit 40, in response to the determining result of the malfunction determining unit 70, controls the emergency control unit 50 to perform the emergency control of the equipments of the malfunctioning remote controller. In this case, the control unit 40 controls the output unit 20 to display the operation status data received from the emergency control unit 50 during the emergency control. Moreover, the control unit 40 transmits the operation status data to the fourth remote controller RC10 to inform the emergency control.

Moreover, the control unit 40 controls the emergency data unit 80 to store the emergency control data periodically received from other remote controller through the communication unit 30, and creates the emergency control data on the control to be performed in the event of the malfunction to transmit the emergency control data to other remote controller.

The emergency control unit 50 performs the emergency control through the emergency control lines in response to the control command of the control unit 40. The emergency control unit 50 emergently controls the indoor units and the outdoor units of the malfunctioning remote controller using the emergency data and address information stored in the emergency data unit 80, firstly performs a high priority control operation of a plurality of control operations, and performs a low priority control operation later. The emergency control unit 50 controls the emergency data unit 80 to store the controlled records on all the control operations performed during the emergency control. The emergency control unit 50 stores data received from the indoor units and the outdoor units during the emergency control, and applies the received operation status data to the control unit 40 such that the operation statuses of the indoor units and the outdoor units being emergently controlled are outputted through the output unit 20.

When the malfunctioning remote controller is recovered and normally works, the emergency control unit 50 releases the emergency control and controls the controlled records stored in the emergency data unit 80 to be transmitted to a corresponding remote controller.

Moreover, when the remote controller is determined as a result of the self-diagnosis of the malfunction determining unit 70, the emergency control unit 50 performs the emergency control by itself or requests other remote controller to perform the emergency control. When the malfunction is determined by the self-diagnosis, the emergency control unit 50 controls the output unit 20 to output a desired message or an alarm sound.

Figure 6:
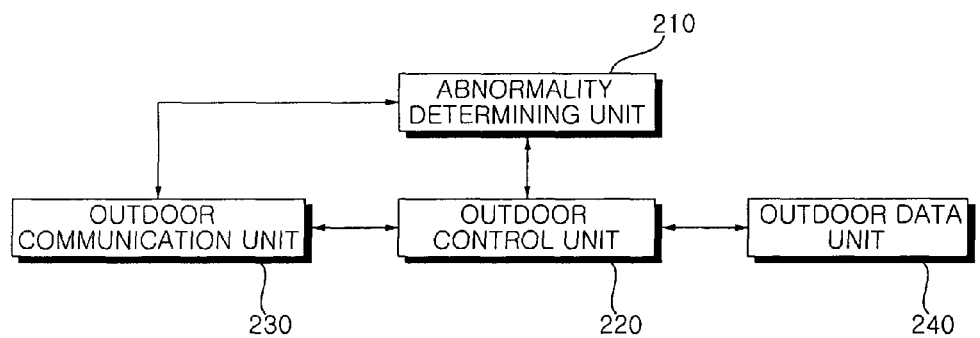
FIG. 6 is a block diagram illustrating an outdoor unit in the present invention.

FIG. 6 is a block diagram illustrating the outdoor unit in the present invention.

Referring to FIG. 6, the outdoor unit O, as described with reference to FIG. 1, includes the compressor and the outdoor heat-exchanger for supplying a refrigerant to the indoor units, an outdoor communication unit 230 for transmitting and receiving data to and from the indoor units and the remote controllers, an outdoor control unit 220 for controlling the compressor and the outdoor heat-exchanger based on the data, and an outdoor data unit 240 for storing control data required to control the compressor and the heat-exchanger.

The outdoor communication unit 230 includes communication terminals to which a communication line from a connected remote controller is connected, and emergency control line communication terminals to which the emergency control lines are connected. The emergency control line communication terminals are not used in an ordinary controlled state, but is used for the communication with other remote controller during the emergency control.

Moreover, the outdoor unit O includes an abnormality determining unit 210 for determining the malfunction of the remote controller in response to the data transmitted and received through the outdoor communication unit 230. This configuration may be applied to the indoor unit I.

The abnormality determining unit 210 determines the abnormality of the remote controller or a malfunction due to the defect of the communication line when a response is not received from the remote controller RC for a preset time while the operation status data are transmitted to the remote controller RC through the outdoor communication unit 230 and the control command is received from the remote controller RC.

Here, the outdoor control unit 220 transmits an emergency control request signal to other remote controllers through the emergency control lines when the abnormality determining unit 210 determines the malfunction of the remote controller. Here, the outdoor control unit 220 transmits the emergency control request signal to the fourth remote controller in the connected state of the emergency control lines as described above with reference to FIG. 3.

After the request of the emergency control, the outdoor control unit 220 controls the outdoor units according to a response from a connected remote controller through the emergency control lines.

FIG. 7 is a system diagram illustrating an equipment controlling system according to a fourth embodiment of the present invention.

Referring to FIG. 7, the equipment controlling system according to a fourth embodiment of the present invention, like as described above in the first to third embodiments, at least one indoor unit I, at least one outdoor unit O, and a controller. Here, the controller includes a local controller LRC, a remote controller RC, and remote control R. The equipment controlling system further includes an emergency controller SC connected to the controller to emergently control the indoor units I and the outdoor units O when the controller malfunctions.

In the fourth embodiment, as illustrated in FIGS. 7A and 7B, the first remote controller RC1 is connected to first and second outdoor units O1 and O2 and first to sixth indoor units I11 to I13 and I21 to I23 to monitor and control the same.

Meanwhile, the emergency controller SC, as illustrated in FIG. 7A, is connected to the first remote controller RC1 to periodically transmit and receive data to and from the first remote controller RC1, and controls the first to sixth indoor units I11 to I13 and I21 to I23 and the first and second outdoor units O1 and O2 connected to the first remote controller RC1 when the first remote controller RC malfunctions due to the abnormality.

In this case, the emergency controller SC is connected to the outdoor unit O and the indoor unit I through connecting terminal provided in the first remote controller RC1. The emergency controller SC may be connected to the outdoor unit O and the indoor unit I through a connecting device provided in the remote controller RC and switched according to an operation status of the first remote controller RC1.

In other words, when the emergency control is required, the communication lines between the indoor unit I and the outdoor unit O is electrically connected to the communication line between the emergency controller SC and the first remote controller RC1 so that the communication for the emergency control is enabled. In this case, when the protocol between the indoor unit and the outdoor unit is different from the protocol between the emergency controller SC and the first remote controller RC1, the communication lines are connected to each other through a converter or a gateway provided in the emergency controller SC or the first remote controller RC1, and data are converted according to the protocol to be transmitted.

The emergency controller SC, as illustrated in FIG. 7B, may be connected between the first remote controller RC1 and the indoor unit I and the outdoor unit O. In this case, the emergency controller SC may includes a communication terminal for the communication with the indoor unit I and the outdoor unit O and other communication terminal for the communication with the first remote controller RC1, and if necessary, the converter or the gateway for converting the data of different protocol.

The emergency controller SC, as described above, may be connected directly to the first remote controller RC1 or between the indoor unit I and the outdoor unit O.

Figure 8:
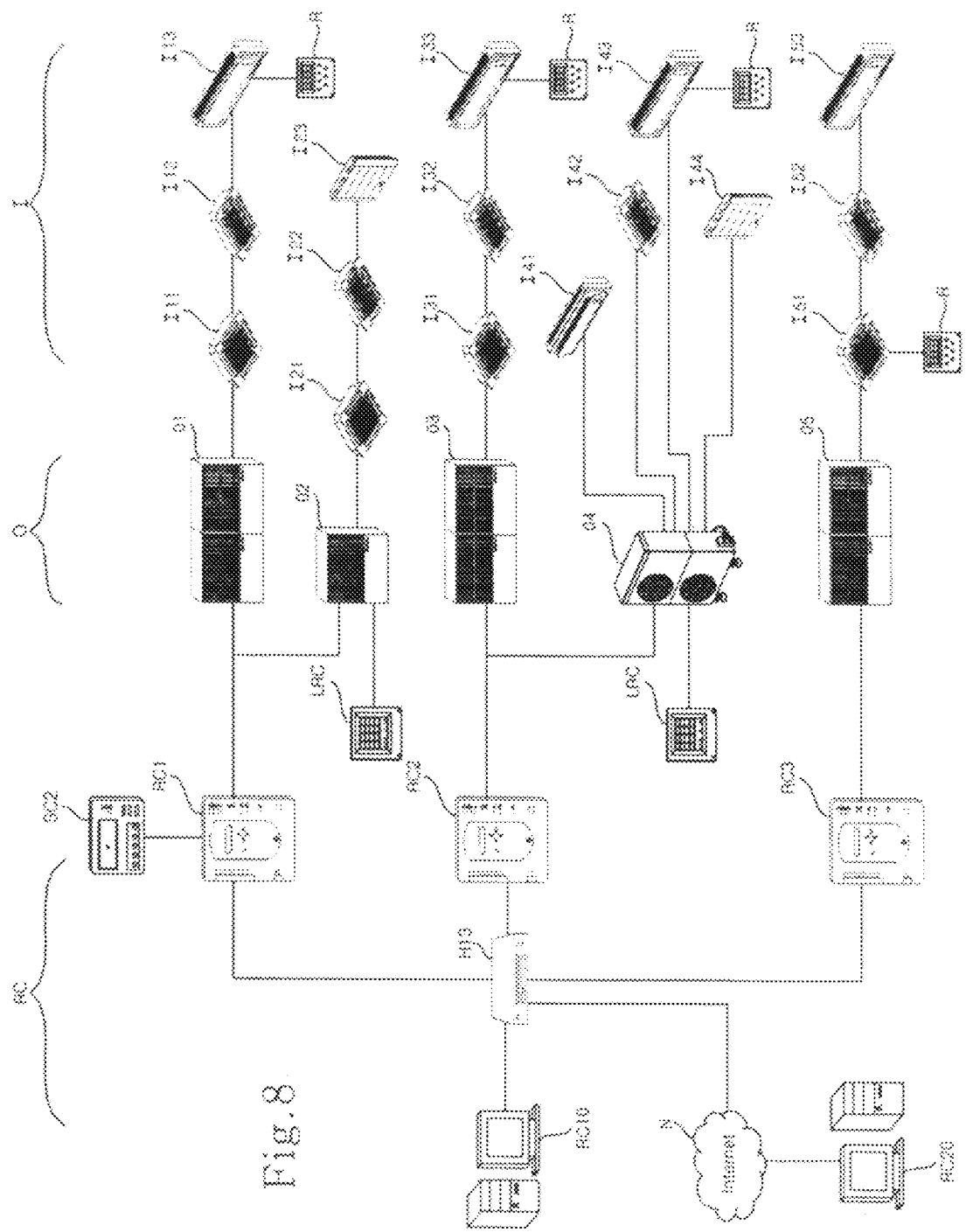
FIG. 8 is a system diagram illustrating an equipment controlling system according to a fifth embodiment of the present invention.

FIG. 8 is a system diagram illustrating an equipment controlling system according to a fifth embodiment of the present invention.

In the equipment controlling system, as illustrated in FIG. 8, when a plurality of remote controllers RC1 to RC3 is connected, an emergency controller SC2 is connected to any one of the remote controllers RC. Other components are identical to those described in the fourth embodiment with reference to FIG. 7 and therefore the description will be omitted.

Here, the first to third remote controllers RC1 to RC3, as described in the first to third embodiment, are connected to the groups of the indoor units and the outdoor units, to each other through a desired sharing device H13, and to a fourth remote controller RC10 through the sharing device H13. The first to third remote controllers RC1 to RC3 are connected to the indoor units or the outdoor units as described above to monitor the operation statuses and operations of the respective equipments.

Moreover, the equipment controlling system may further include the fourth remote controller RC10 connected to the first to third remote controllers RC1 to RC3 to integrally control, or a fifth remote controller RC20 connected thereto through Internet as occasion demands. Here, the fourth remote controller RC10 integrally controls all the equipments connected to the first to third remote controllers RC1 to RC3. The fourth and fifth remote controllers RC10 and RC20 control the equipments through the first to third remote controllers RC1 to RC3.

On the other hand, the emergency controller SC2 is connected to the first remote controller RC1 to perform the emergency control of the equipments in a first group.

Here, the emergency controller SC2 may be connected to other remote controller different from the first remote controller RC1, and to the second to fifth remote controllers RC2, RC3, RC10, and RC20, and may emergently control the equipments of other remote controller using the mutual connection between the first to third remote controllers RC1 to RC3.

In other words, the emergency controller SC2 may emergently control the equipments of a second group using the connection between the first remote controller RC1 and the second remote controller RC2 during the malfunctioning of the second remote controller RC2. In this case, the emergency controller SC2 may perform the equipments according to requests for the emergency control from the fourth or fifth remote controller RC10 or RC20, requests of the emergency control from the equipments, and a request of the emergency control from the first remote controller RC1.

Figure 9:
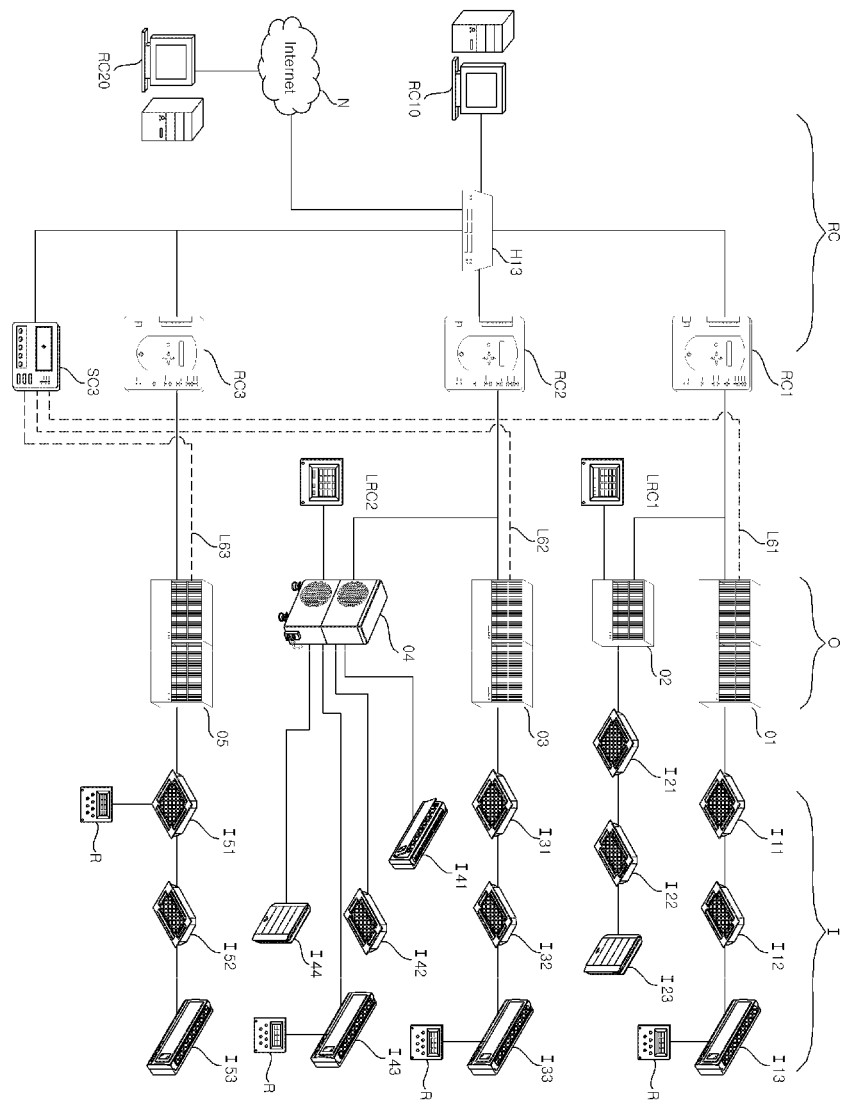
FIG. 9 is a system diagram illustrating an equipment controlling system according to a sixth embodiment of the present invention.

FIG. 9 is a system diagram illustrating an equipment controlling system according to a sixth embodiment of the present invention.

The equipment controlling system, as illustrated in FIG. 9, may include an emergency controller SC3 connected to the first to third remote controllers RC1 to RC3 through a sharing device H13. Other components are identical to those described in the sixth and seventh embodiments with reference to FIGS. 7 and 8, and their description will be omitted.

As described above, the first to third remote controllers RC1 to RC3 are connected to each other through the sharing device H13 and to the emergency controller SC3 through the same sharing device. In this case, the equipments of the first to third groups which are connected to the first to third remote controllers RC1 to RC3 are connected to the emergency controller SC3 through emergency control lines L61 to L63.

The equipments of the first group, that is, the first to sixth indoor units I11 to I13 and I21 to I23, and the first and second outdoor units O1 and O2 connected to the first remote controller RC1, are connected to the emergency controller SC3 through the first emergency control line L61, and the equipments of the second group, that is, the seventh to thirteenth indoor units I31 to I33 and I41 to I44 and the third and fourth outdoor units O3 and O4 connected to the second remote controller, are connected to the emergency controller SC3 through the second emergency control line L62. The equipments of the third group, that is, the fourteenth to sixteenth indoor units I51 to I53 and the fifth outdoor unit O5 connected to the third remote controller RC3, are connected to the third emergency controller SC3 through the third emergency control line L63. Here, the connection order between the respective equipments and the emergency controller through the emergency control lines as shown in the drawing is just an example and may be changed as circumstance is changed.

The first to third emergency control lines L61 to L63 may use the same communication line as that of connecting the equipments to the remote controller.

The emergency controller SC3 emergently controls the indoor units and the outdoor units which are connected thereto through the emergency control lines when at least one of the equipments needs to be emergently controlled. In this case, the emergency controller SC3 works independently from the respective remote controllers, stores data by distinguished and separated according to the respective remote controllers, and performs the emergency control to the equipments using the emergency control lines according to the requests for the emergency control from the fourth or fifth remote controller RC10 or RC20, the equipments of the respective equipments, and the respective remote controllers RC1 to RC3.

Moreover, the emergency controller SC3 may transmit a controlled record during the emergency control for the equipments and operation status of the equipments under the emergency control to an upper remote controller, that is, the fourth or fifth remote controller RC10 or RC20.

Figure 10:
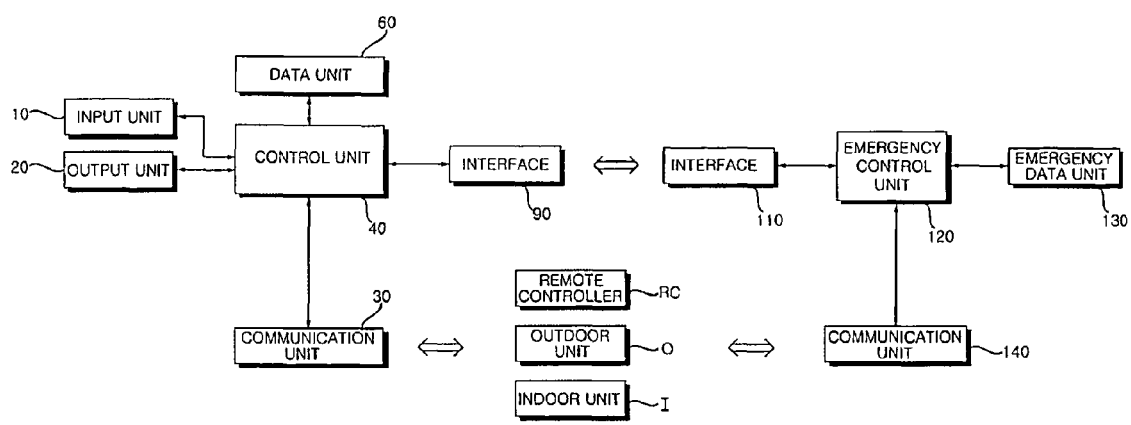
FIG. 10 is a block diagram illustrating a remote controller and an emergency controller according to the fourth to sixth embodiments of the present invention.

FIG. 10 is a block diagram illustrating the remote controller and the emergency controller according to the fourth to sixth embodiments of the present invention.

Referring to FIG. 10, the remote controller RC according to the fourth to sixth embodiments of the present invention includes a data unit 60, an input unit 10, an output unit 20, a control unit 40, a communication unit 30, and an interface 90. The configuration may be employed in the first to third remote controllers RC1 to RC3. The configuration may be employed in the fourth remote controller RC10 as occasion demands. In this case, since same terms and reference numerals are assigned to the same components as those of the remote controller RC in FIG. 5, their description will be omitted. However, FIG. 10 illustrates an example of the emergency controller being connected as illustrated in FIGS. 7 and 8.

The communication unit 30 includes a communication module related to at least one communication and transmits and receives data to and from other remote controller, that is, the first to third remote controllers RC1 to RC3 or the fourth and fifth remote controllers RC10 and RC20. In this case, the communication unit 30 handles an external access through Internet. In other words, the communication units of the first to fourth remote controllers RC1 to RC3 and RC10 handle access through Internet of the fifth remote controller RC20. Moreover, the communication unit 30 transmits and receives data to and from the equipments including the indoor units and the outdoor units for the transmission of a control command from the control unit 40, and receives the operation statuses of the respective equipments.

The interface 90 includes digital input and output terminals, a communication line connecting terminal, and an emergency line connecting terminal. The interface 90 may be included in the communication unit if necessary.

When the emergency controller SC is connected as described in association with the fourth and fifth embodiments with reference to FIGS. 7 and 8, the interface 90 includes communication line connecting terminals for connecting the communication lines to the outdoor units and the indoor units and an emergency control line connecting terminal for connecting the emergency control line to the emergency controller SC, and further includes a connection device for switching the electrical connection between the terminals by switching. In this case, the communication line connecting terminals are connected to the communication lines of the indoor units and the outdoor units, and the emergency control line connecting terminal is connected to the communication line of the emergency controller SC. If the communication with the indoor units and the outdoor units is different from the communication with the emergency controller, the terminals may be connected to each other a converter or a gateway. In this case, the communication line connecting terminals and the emergency control line connecting terminal are connected to each other according to the switching of the connection device.

The control unit 40 processes data to be transmitted and received through the communication unit 30, controls the input and output of the data through the input unit 10 and the output unit 20, operation of the equipments such as the indoor units and/or the outdoor units, and controls the output unit 20 to display the operation status thereof.

Moreover, the control unit 40 creates emergency control data on the control operation to be performed during the malfunction and transmits the created emergency control data to the emergency controller SC. When the emergency controller SC is connected as described with reference to FIGS. 7 and 8, the control unit 40 transmits the emergency control data through the interface 90 and transmits and receives the data periodically according to the connection state.

The control unit 40, when the emergency controller is connected as illustrated in FIG. 9, transmits the emergency control data to the emergency controller SC through the communication unit 30. As occasion demands, after the data are transmitted to the fourth remote controller RC10, the data may be transmitted to the emergency controller SC through the fourth remote controller RC10.

In this case, the emergency control data contain the control operations to be performed, address information for communication with the outdoor units O and the indoor units I, schedule data, and power control information, particularly, a priority data on a high priority control operation to be firstly performed and a low priority control operation.

Meanwhile, the emergency controller SC includes an interface 110 connected to the remote controller RC, an emergency control unit 120, an emergency data unit 130, and a communication unit 140.

In this case, the interface 110 of the emergency controller SC, as illustrated in FIGS. 7 and 8, corresponds to a case where the emergency controller SC is connected to the remote controller, and is connected to the interface 90 of the remote controller RC to periodically transmit and receive data.

Meanwhile, in a case where the emergency controller SC is connected in the manner as illustrated in FIG. 9, the interface 110 is connected to the remote controller RC through the communication unit 140. The communication unit 140 of the emergency controller SC is connected the respective equipments through the emergency control lines.

The emergency control unit 120 periodically communicates with the remote controller RC through the interface 110 or the communication unit 140 to receive the emergency control data from the remote controller RC and to store the emergency control data in the emergency data unit 130. The emergency controller SC, during the communication with the plurality of remote controllers as illustrated in FIGS. 8 or 9, distinguishes and stores the emergency control data by the respective remote controllers.

The emergency control unit 120 determines the malfunction of the remote controller RC according to the communication status of the interface 110 or the communication unit 140, and performs the emergency control of the equipments connected thereto. During the periodic communication with the remote controller RC, the emergency control unit 120 determines that the remote controller RC malfunctions to emergently control the equipments including the outdoor units and the indoor units, when a response is not received from the remote controller RC for a preset time, when the request for the emergency control is received from the equipments such as the outdoor units and the indoor units, when the request for the emergency control is received from other controller connected to the upper level remote controller RC, or when the request for the emergency control is received from the remote controller RC.

In other words, the emergency control unit 120, in a case of the connection as illustrated in FIGS. 7 to 9, determines that the remote controller RC1 malfunctions to emergently control the equipments of the remote controller, such as the first to sixth indoor units I11 to I13 and I21 to I23 and the first and second outdoor units O1 and O2, when the response is not received from the first remote controller RC1 for a preset time during the periodic communication with the connected remote controller.

Moreover, the emergency control unit 120 performs the emergency control of corresponding equipments according to the request for the emergency control, received from the first to third remote controllers RC1 to RC3, the fourth or fifth remote controller RC10 or RC20, or the equipments through the communication unit 140. When the emergency controller is connected as illustrated in FIG. 9, the request for the emergency control may be received from the equipments through the emergency control lines, and the equipments are emergently controlled through the emergency control lines.

Here, the malfunctioning of the remote controller RC may be determined not only when the remote controller RC does not work normally due to the defect or abnormality of the remote controller RC but when the communication is disconnected due to the trouble of the communication lines with the indoor units or between the indoor units and the outdoor units regardless of the normal operation of the remote controller RC.

The emergency control unit 120 emergently controls the respective equipments based on the stored emergency control data, performs the high priority control operation firstly, and performs the low priority control operation later. The emergency control unit 120 stores the controlled records on the respective control operations in the emergency data unit 130. When the low priority control operation is not performed, the emergency control unit 120 stores the controlled records including information on the not-performed control operations. Moreover, the emergency control unit 120 stores the data received from the indoor units and the outdoor unit during the emergency control, and transmits the received operation status data to other remote controllers through the communication unit 140 such that the operation statuses of the equipments to be emergently controlled are displayed through the output unit 20 of the remote controller.

The emergency control unit 120 releases the emergency control when the malfunctioned remote controller is recovered and works normally, and transmits the controlled records stored in the emergency data unit 130 to a corresponding remote controller.

Here, the respective equipments, for example, the indoor units determine the malfunction due to the abnormality of the remote controllers or the communication lines when responses are not received from the remote controllers RC for a preset time during the transmission of the operation status to the remote controller RC and the reception of the control command from the remote controllers RC. In this case, the indoor units transmit a signal of requesting the emergency control to the emergency controller through the emergency control lines when the malfunction of the remote controller is determined. The emergency control line communication terminals are not used in an ordinary controlled status, but for the communication with the emergency controller SC during the emergency control.

The operation of the equipment controlling system according to the embodiments of the present invention will be described as follows.

Hereinafter, based on the first to third embodiments, the equipment controlling system will be described by taking the first remote controller as an example from the first to fourth remote controllers.

Figure 11:
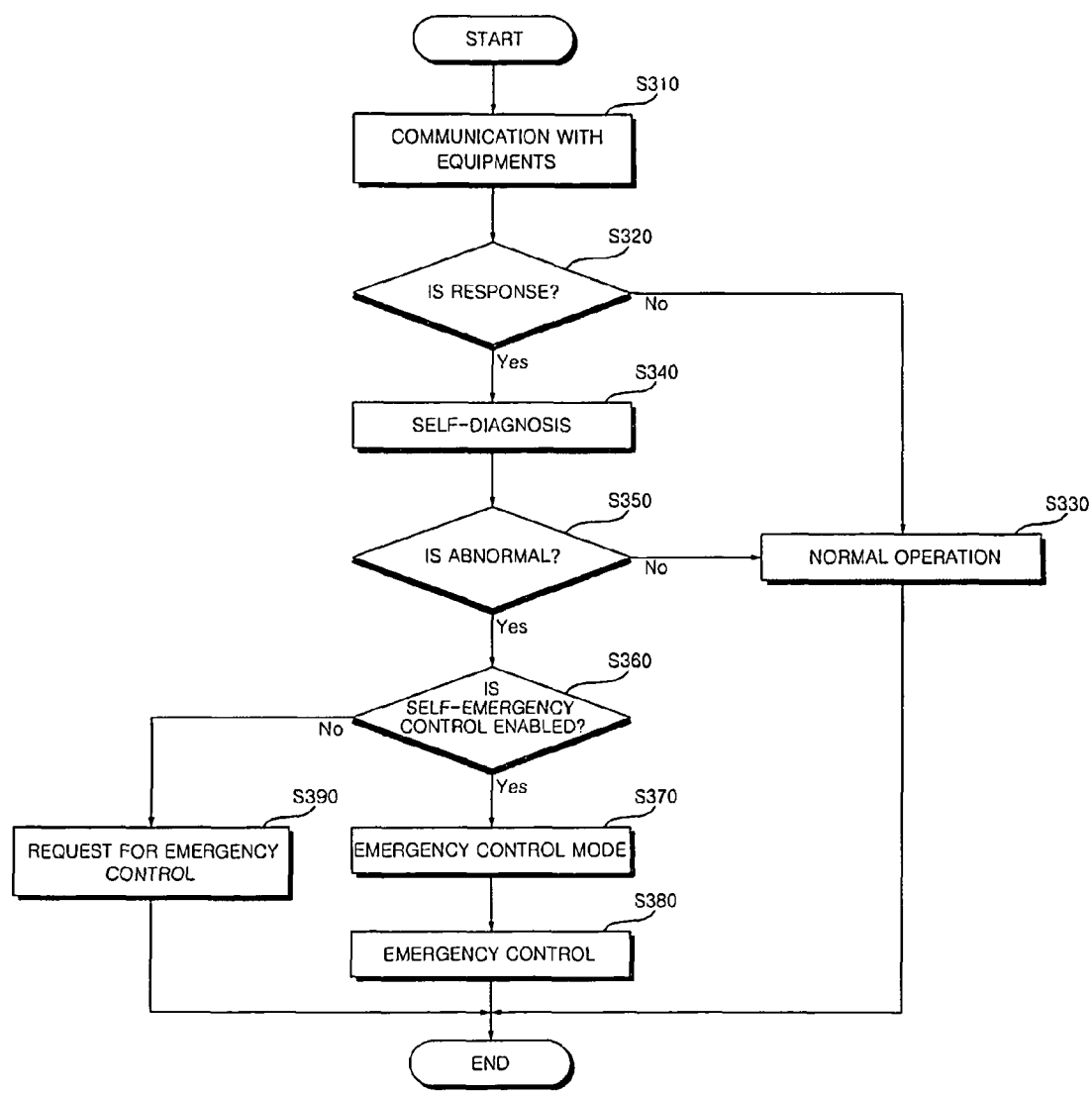
FIG. 11 is a flowchart illustrating a malfunction self-diagnosing method of the remote controller in the equipment controlling system according to the first to third embodiments of the present invention.

FIG. 11 is a flowchart illustrating a malfunction self-diagnosing method of the remote controller in the equipment controlling system according to the first to third embodiments of the present invention.

As illustrated in FIG. 11, the first remote controller RC transmits the schedule or a control command for the operation control to the first to sixth indoor units I11 to I13 and I21 to I23 and the first and second outdoor units O1 and O2 and receives the operation status data from the outdoor units and the indoor units, periodically or in real time (S310). Moreover, the first remote controller RC1 performs the communication with the second remote controller RC2 or the third remote controller RC3 periodically. In this case, the first remote controller RC1 creates and transmits the emergency control data to at least one of the second to fourth remote controllers RC2 to RC10.

When a response is not received from the outdoor units and the indoor units for a preset time (S320), the first remote controller RC1 determines whether there is malfunction due to the abnormality through the self-diagnosis (S340). When the communication is normal or a temporary communication error occurs but is immediately recovered, normal operation is performed (S330).

When the malfunction is determined due to the abnormality, whether the self-emergency control is enabled is determined (S360), a mode is switched to a self-emergency control mode (S370), and the emergency control is performed by the emergency control unit 50 (S380). When the malfunction is determined due self-abnormality regardless of the response during the communication, the first remote controller RC1 performs or requests the emergency control. However, in this case, the communication with the outdoor units or the indoor units must be possible in the emergency control mode.

Meanwhile, when the self-emergency control is unable, the first remote controller RC1 request the emergency control to one of the second to fourth remote controllers RC2 to RC10 (S390).

For example, when a response is not received from the indoor unit and the outdoor unit, the first remote controller RC1 determines whether the control is unable due to the communication error through the malfunction determining unit 70, and requests the emergency control to one of the second to fourth remote controllers RC2 to RC10.

At this time, when the emergency control lines are connected as illustrated in FIG. 2, the first remote controller RC1 requests the emergency control to the second remote controller RC2. The first remote controller RC1 requests the emergency control to the second to fourth remote controllers RC2 to RC10 when the emergency control lines are connected as illustrated in FIG. 3 or 4. This may be changed according to the connection state of the emergency control lines or the communication state of communicating remote controller. When the emergency control lines are connected as illustrated in FIG. 4, the emergency control unit 50 controls the connecting device such that the communication lines of the outdoor units and the indoor units are connected to the emergency control lines.

Figure 12:
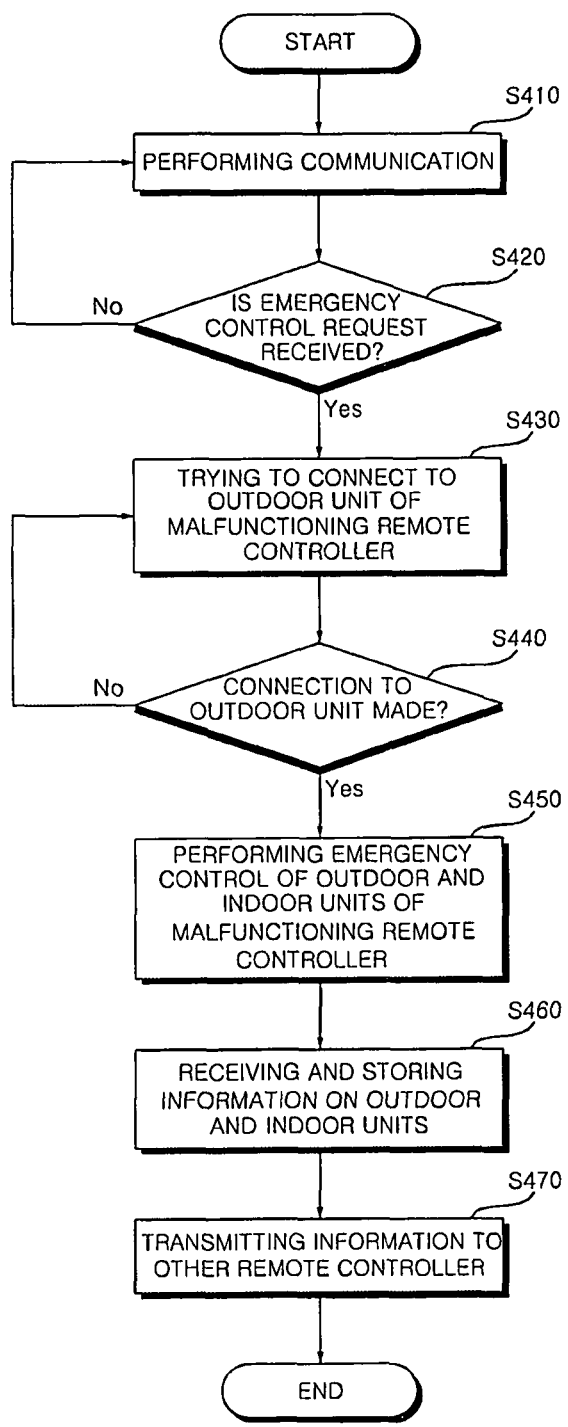
FIG. 12 is a flowchart illustrating an emergency controlling method of the remote controller in the equipment controlling system according to the first to third embodiments of the present invention.

FIG. 12 is a flowchart illustrating an emergency controlling method of the remote controller in the equipment controlling system according to the first to third embodiments of the present invention.

Referring to FIG. 12, as described in connection with FIG. 12, when the first remote controller RC1 communicates with the second to fourth remote controllers RC2 to RC10 (S410), the first remote controller RC1 can identify which of the second to fourth remote controllers RC2 to RC10 malfunctions on the basis of the presence of their responses. When an emergency control request is received from the second to fourth remote controllers RC2 to RC10 or from the indoor units and outdoor units connected through an emergency control line (S420), the first remote controller RC1 determines that a remote controller malfunctions.

For example, when no response is received from the third remote controller RC3, the first remote controller RC1 determines that the third remote controller RC3 malfunctions. In addition, when an emergency control request is received from the second remote controller RC2, fourth remote controller to RC10, or fourteenth to sixteenth indoor units I51 to I53 or fifth outdoor unit O5, the first remote controller RC1 determines that the third remote controller RC3 malfunctions.

Thereafter, the first remote controller RC1 tries to connect through emergency control lines to the equipments of the third remote controller RC3 (that is, the fourteenth to sixteenth indoor units I51 to I53 and fifth outdoor unit O5) (S430). If a connection is successfully made (S440), the first remote controller RC1 starts emergency control through emergency control lines L11, L23 and L31 (S450).

The first remote controller RC1 reads emergency control data associated with the third remote controller RC3 from the emergency data unit 80, and performs emergency control of the fourteenth to sixteenth indoor units I51 to I53 and fifth outdoor unit O5 on the basis of the read emergency control data.

At this time, the first remote controller RC1 performs a plurality of control operations in order of their priorities, and stores their controlled records. The first remote controller RC1 also stores operation status data received through the emergency control lines from the fourteenth to sixteenth indoor units I51 to I53 and fifth outdoor unit O5 (S460). If necessary, the first remote controller RC1 sends the operation status data to the fourth remote controller RC10 (S470).

In the case when the third remote controller RC3 normally works, the first remote controller RC1 sends emergency control records and current operation status data of the fourteenth to sixteenth indoor units I51 to I53 and fifth outdoor unit O5 to the third remote controller RC3, and releases emergency control.

The normally-working third remote controller RC3 performs delayed control operations on the basis of the control records and operation status data received from the first remote controller RC1, and then switches to the normally working state.

Figure 13:
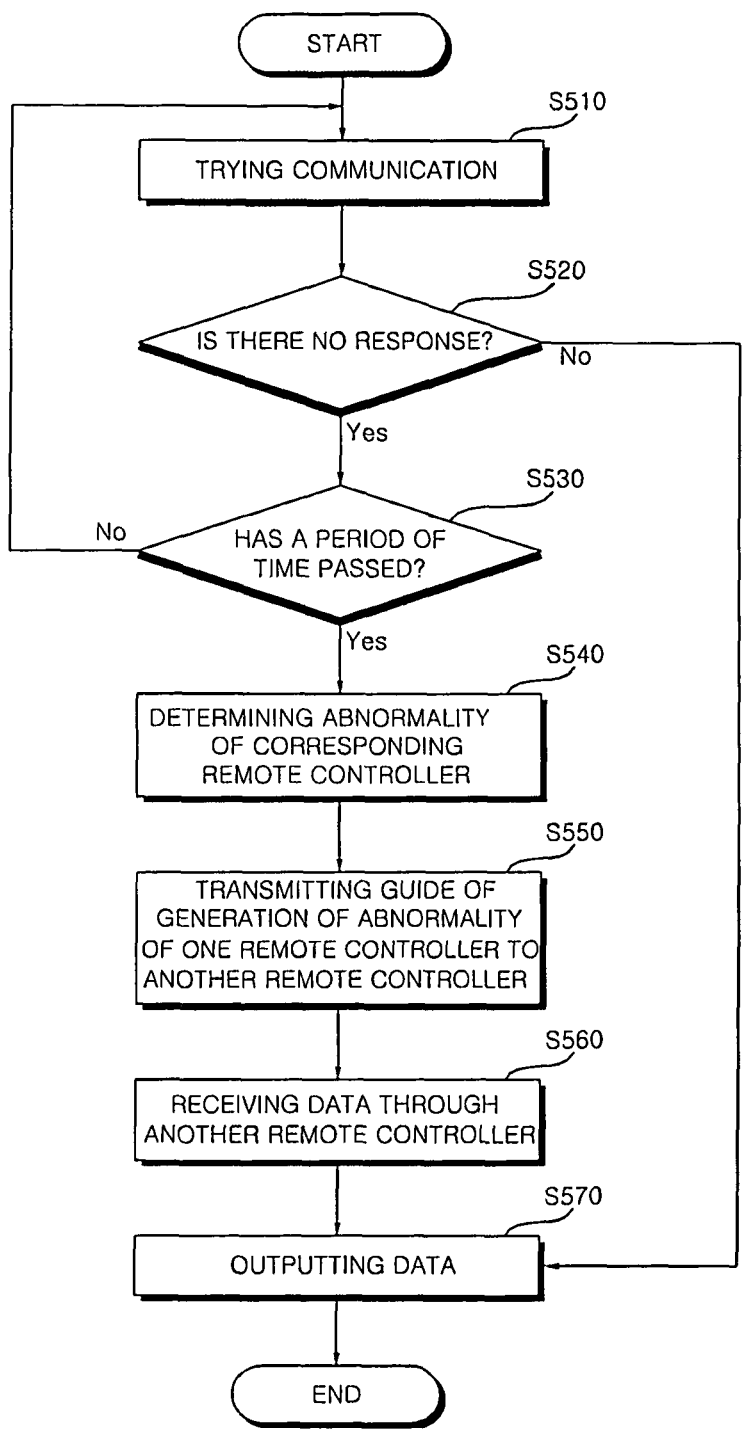
FIG. 13 is a flowchart illustrating another emergency controlling method of the remote controller in the equipment controlling system according to the first to third embodiments of the present invention.

FIG. 13 is a flowchart illustrating another emergency controlling method of the remote controller in the equipment controlling system according to the first to third embodiments of the present invention.

Referring to FIG. 13, the fourth remote controller RC10 periodically transmits and receives data to and from the first to third remote controller RC1 to RC3 (S510). Then, when any response is not received from one remote controller, i.e. the third remote controller RC3 for a predetermined period of time (S420 and S530) or an emergency control is requested from an indoor unit, an outdoor unit, and another remote controller, generation of an error of the third remote controller RC3 is determined (S540).

The fourth remoter controller RC10 is normally operated, and transmits a guide on generation of an error due to a malfunction of the third remoter controller RC3 to the first and second remote controller RC1 and RC2 (S550). The fourth remote controller RC10 transmits a guide for the malfunction from the first and second remote controllers RC1 and RC2 to a remote controller of a low control load, and transmits a guide for a malfunction according to the connection state of an emergency control line. That is, when the emergency control line is connected as FIG. 2, the fourth remote controller RC10 transmits a guide for a malfunction to the first remote controller RC1.

If an emergency control by the first remote controller RC1 starts, the fourth remote controller RC10 receives operation status data about the fourteenth to sixteenth indoor unit I51 to I53 from the first remote controller RC1 and the fifth outdoor unit O5 and outputs the operation state.

Hereinafter, the case where the first remote controller RC1 and the emergency controller are connected to each other and the first remote controller RC1 malfunctions will be described as an example based on the fourth to sixth embodiments.

Figure 14:
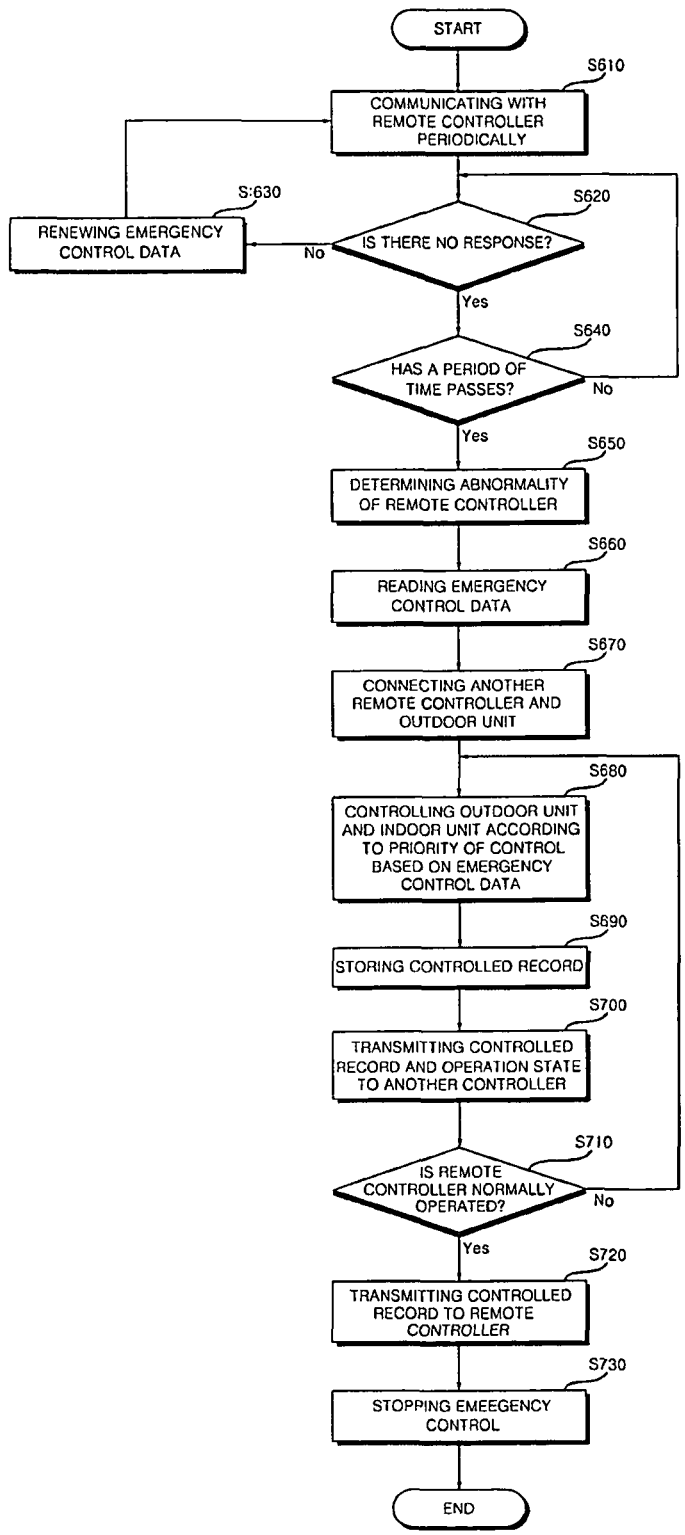
FIG. 14 is a flowchart illustrating an operating method of the emergency controller according to the fourth to sixth embodiments of the present invention.

FIG. 14 is a flowchart illustrating an operating method of the emergency controller according to the fourth to sixth embodiments of the present invention.

As illustrated in FIG. 14, the emergency controller SC periodically communicates with the first remote controller RC1 (S610), and receives emergency control data from the first remote controller RC1 to renew the emergency control data (630).

Then, when the emergency controller SC does not receives any response from the first remote controller RC1 (S620), especially for a predetermined period of time (S640), it is determined that an error is generated in the first remote controller RC1 and the first remote controller RC1 malfunctions (S650). Here, a temporary communication error is excluded from the determination of the malfunction. If a response is not received for a predetermined period of time and for a predetermined frequency, a malfunction due to generation of an abnormality of communication and of the remote controller itself is determined. Meanwhile, as illustrated in FIGS. 8 and 9, the emergency controller SC determines the malfunction of the first remote controller RC1 according to a request for an emergency control received from equipment or the second to fifth remote controllers.

The emergency controller SC reads data received from the first remote controller RC1 to be stored, from an emergency date unit (S660) and is connected to the equipment connected to the first remote controller SC, i.e. the first to sixth indoor units 111 to 113 and 121 to 123 and the first and second outdoor units O1 and O2 to perform an emergency control (S670).

Then, the emergency controller SC performs the control operation on the equipment in correspondence to the preset priority of control based on the emergency control data (S680). A control operation of a high priority is performed first and a control operation of a lower priority is performed later.

The emergency controller SC stores all control operation on the equipment as a controlled record (S690), and stores information on the control operation that has not been processed but been delayed together. Furthermore, the emergency controller SC stores the operation status data of the emergently controlled equipment together. Here, when the fourth remote controller RC10 exists on a high priority as in FIGS. 8 and 9, the operation status data about the emergently controlled equipment and the controlled record data can be transmitted to the fourth remote controller RC10 (S700).

When the first remote controller RC1 is normally operated during the emergency control (S710), the emergency controller SC transmits the operation status data of the equipment to the first remote controller RC1 and stops the emergency control (S730).

Figure 15:
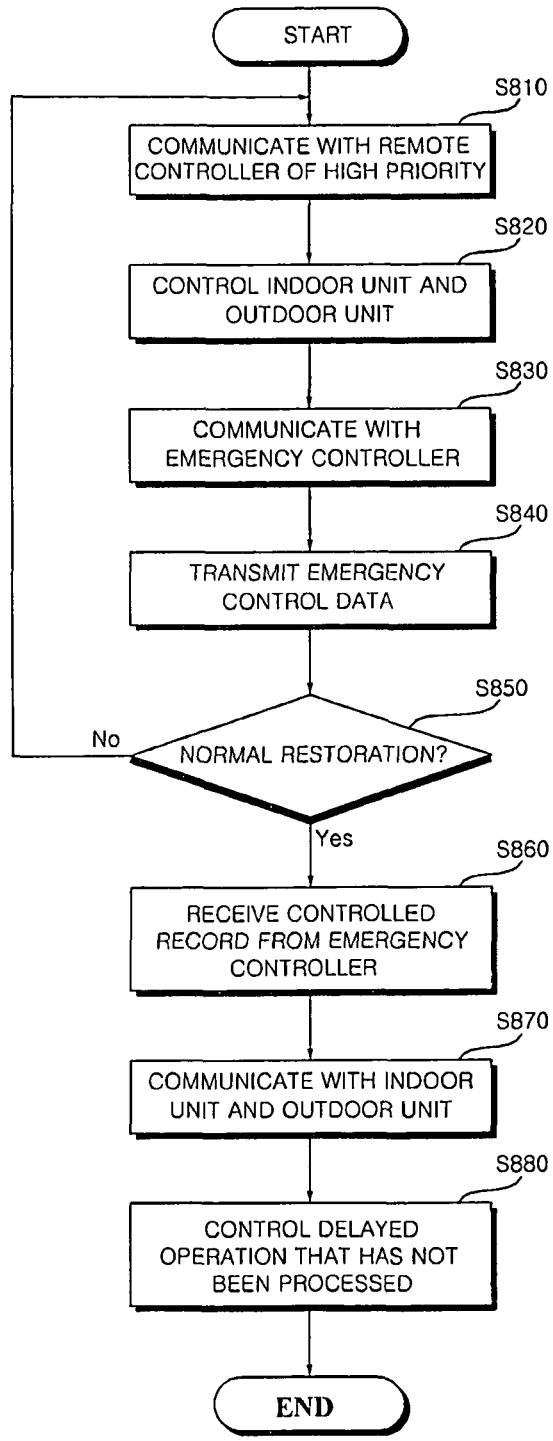
FIG. 15 is a flowchart illustrating an operation starting method of the remote controller after recovery of the malfunction of the remote controller in the equipment controlling system according to the fourth to sixth embodiments of the present invention.

FIG. 15 is a flowchart illustrating an operation starting method of the remote controller after recovery of the malfunction of the remote controller in the equipment controlling system according to the fourth to sixth embodiments of the present invention.

As illustrated in FIG. 7, the first remote controller RC1 communicates with a remote controller of a high priority, i.e. the fourth remote controller RC10, receives a control command of the fourth remote controller RC10, and transmits the operation status data about the equipment of the first group (S810). The first remote controller RC communicates with the first to six indoor units 111 to 113 and 121 to 123 and the first and second outdoor units O1 and O2 periodically and in real time to transmit a control command for a schedule or an operation control, and controls them in correspondence to a control command received from the fourth remote controller RC10 and receives the operation status data of the indoor unit and the outdoor unit (S820).

The first remote controller RC1 periodically communicates with the emergency controller SC to transmit emergency control data (S830 and S840). Here, the order according to the communication among the fourth remote controller RC10, the equipment, and the emergency controller SC can be varied.

Then, when the malfunction due to generation of an error of the first remote controller RC1 itself or a communication termination with the equipment is determined, the emergency controller SC emergently controls the equipment as in FIG. 14.

Meanwhile, if the first remote controller RC1 is restored and normally operated (S850), the first remote controller RC1 restarts communication with the emergency controller SC and receives the controlled record data from the emergency controller SC (S860).

The first remote controller RC1 restarts communication with the equipment including the indoor unit and the outdoor unit (S870), receives the operation state of the equipment, performs a delayed control operation based on a controlled record, and controls the equipment (S880). Furthermore, the first remote controller RC1 restarts communication with the remote controller of a high priority to transmit and receive data.

The equipment controlling system and the controlling method thereof according to the present invention can control equipment when a remote controller malfunctions, by using a plurality of remote controllers or adding an emergency controller. Therefore, the equipment can be operated on the basis of a set schedule and prevents the electric power from exceeding a set value through control of the set electric power, thereby solving a control problem due to a malfunction of the remote controller.

Although the equipment controlling system and a controlling method thereof according to the present invention have been described with reference to the embodiment shown in the drawings, these are merely illustrative, and those skilled in the art will understand that various modifications and equivalent other embodiments of the present invention are possible. Consequently, the true technical protective scope of the present invention must be determined based on the technical spirit of the appended claims.

What is claimed is:

1. An equipment controlling system comprising:
a first controller connected to equipments of a first group to monitor and control operations of the equipments of the first group; and
a second controller connected to equipments of a second group to monitor and control operations of the equipments of the second group;
wherein the first controller emergently controls the equipments of the second group based on stored emergency control data of the second controller and stores a controlled record when the second controller malfunctions,
wherein the second controller emergently controls the equipments of the first group based on stored emergency control data of the first controller and stores a controlled record when the first controller malfunctions,
wherein the first controller controls the equipments of the second group to perform a high priority control operation when the second controller malfunctions,
wherein the equipments of the first and second groups include at least one indoor unit and at least one outdoor unit,
wherein the first controller and the second controller are connected to each other through an emergency control line,
wherein the first controller is connected to the equipments of the second group through the emergency control line according to a wire communication or a wireless communication, and the second controller is connected to the equipments of the first group through the emergency control line.

2. The equipment controlling system of claim 1, wherein the first controller controls any one of a demand control, a peak power control, a power save control, and an energy consumption control from a high priority firstly.

3. The equipment controlling system of claim 1, wherein the first controller transmits the controlled record to the second controller when the second controller normally works, and the second controller performs a control operation which is delayed without being handled based on the received controlled record.

4. The equipment controlling system of claim 1, wherein the first controller determines that the second controller malfunctions and emergently controls the equipments of the second group, when a request for an emergency control is received from the equipments of the second group or when a response is not received from the second controller for a preset time during the periodic communication with the second controller.

5. The equipment controlling system of claim 4, further comprising a third controller, connected to an upper level of the first controller and the second controller, to detect the malfunction of the first controller and the second controller, and to transmit malfunction information of the first controller to the second controller such that the equipments of the first group are controlled by the second controller during the malfunction of the first controller.

6. An equipment controlling system comprising:
a plurality of equipments;
a controller connected to the pluality of equipments to monitor and control the plurality of equipments; and
an emergency controller connected to the controller and to the plurality of equipments to emergently control the plurality of equipments during the malfunction of the controller;
wherein the emergency controller controls the plurality of equipments to perform a high priority control operation according to a priority based on emergency control data containing priority data when the controller malfunctions,
wherein the emergency controller stores a controlled record on the equipments, transmits the controlled record to the controller when the controller normally works, and stops the emergency control,
wherein the plurality of equipments include at least one indoor unit and at least one outdoor unit,
wherein the emergency controller is connected to the plurality of equipments through an emergency control line,
wherein the emergency controller emergently controls the plurality of equipments through the emergency control line and stores data, and
wherein the emergency controller works independently from the controller.

7. The equipment controlling system of claim 6, wherein the emergency controller determines that the controller malfunctions and emergently controls the plurality of equipments when a response is not received from the controller during a periodic communication with the controller, or when a request for an emergency control is received from the plurality of equipments or other controller connected to an upper level of the controller.

8. An emergency controlling method of an equipment controlling system, comprising:
determining a malfunction of a second controller for controlling equipments of a second group via a first controller for controlling equipments of a first group;
emergently controlling the equipments of the second group based on stored emergency control data via the first controller;
storing a controlled record on the equipments of the second group via the first controller; and
transmitting the controlled record to the second controller via the first controller and releasing the emergency control of the equipments of the second controller during a normal operation of the second controller,
wherein the first controller controls the equipments of the second group to perform a high priority control operation based on stored emergency control data, and stores a controlled record thereof,
wherein the equipments of the first and second groups include at least one indoor unit and at least one outdoor unit,
wherein the first controller and the second controller ar econnected to each other through an emergency control line,
wherein the first controller is connected to the equipments of the second group through the emergency control line according to a wire communication on a wireless communication, and the second controller is connected to the equipments of the first group through the emergency control line.

9. The emergency controlling method of claim 8, wherein the first controller determines that the second controller malfunctions when a response is not received from the second controller for a preset time, when a request for an emergency control is received from the equipments of the second group, or when malfunction information of the second controller is received from a third controller connected to an upper level.

10. The emergency controlling method of claim 8, wherein the first controller firstly performs at least one of a high priority demand control, a peak power control, a power save control, and an energy consumption control according to a priority during the emergency control of the equipments of the second group.

11. The emergency controlling method of an equipment controlling system, comprising:
communicating with a controller for controlling equipments via an emergency controller;
determining a malfunction of the controller via the emergency controller;
emergently controlling the equipments based on stored emergency control data of the controller when the controller malfunctions via the emergency controller;
storing a controlled record on the emergency control; and
transmitting the controlled data to the controller when the controller normally works; and
stopping the emergency control,
wherein, in the emergently control, the emergency controller firstly performs a high priority control operation according to priority data of the emergency control data,
wherein the equipments include at least one indoor unit and at least one outdoor unit,
wherein the emergency controller is connected to the equipments through an emergency control line,
wherein the emergency controller controls the equipments through the emergency control line and stores data, and
wherein the emergency controller works independently from the controller.

12. The emergency controlling method of claim 11, wherein, in the determining of a malfunction, the emergency controller determines the malfunction of the controller when a response is not received from the controller for a preset time, or when a request for an emergency control is received from one of the controller, the equipment, and other controller connected to the controller.

* * * * *